(12) United States Patent
Osborne (10) Patent No.: US 11,897,270 B2
(45) Date of Patent: Feb. 13, 2024

(54) FLUID SUPPLY VALVE

(71) Applicant: Hewlett-Packard Development Company, L.P., Spring, TX (US)

(72) Inventor: William Scott Osborne, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 377 days.

(21) Appl. No.: 17/257,032

(22) PCT Filed: Nov. 20, 2018

(86) PCT No.: PCT/US2018/062024
§ 371 (c)(1),
(2) Date: Dec. 30, 2020

(87) PCT Pub. No.: WO2020/106278
PCT Pub. Date: May 28, 2020

(65) Prior Publication Data
US 2021/0268804 A1  Sep. 2, 2021

(51) Int. Cl.
*B41J 2/175* (2006.01)
*F16K 1/12* (2006.01)

(52) U.S. Cl.
CPC ....... *B41J 2/17596* (2013.01); *B41J 2/17509* (2013.01); *B41J 2/17523* (2013.01); *F16K 1/123* (2013.01); *Y10T 137/87949* (2015.04)

(58) Field of Classification Search
CPC ............. B24K 2/1759; B24K 2/17523; B24K 2/17596

USPC ............... 251/149.1, 149.6; 347/86
See application file for complete search history.

(56) References Cited

U.S. PATENT DOCUMENTS

| 5,751,320 A * | 5/1998 | Scheffelin | B41J 2/1752 347/85 |
| 5,903,293 A | 5/1999 | Nikkels et al. | |
| 5,911,403 A * | 6/1999 | deCler | B67D 7/0294 251/149.6 |

(Continued)

FOREIGN PATENT DOCUMENTS

| CN | 205364840 U | 7/2016 |
| JP | 09-207352 A | 8/1997 |

(Continued)

*Primary Examiner* — Robert K Arundale
(74) *Attorney, Agent, or Firm* — Brooks, Cameron & Huebsch, PLLC (57) ABSTRACT

Some examples include a valve for a printing fluid supply system, the valve including a static portion and a dynamic portion. The static portion includes a stem extending along a longitudinal axis. The stem includes a head, a tail, and a shaft extending between the head and the tail. The dynamic portion is disposed around the stem. The dynamic portion is longitudinally movable along the stem between a closed position and an opened position. The dynamic portion includes a neck and a body extending longitudinally from the neck, the neck to seal around the head in the closed position and fluidly open in the opened position, the body to slidably fluidly seal against a housing between opened and closed positions. A liquid ink pathway and an air pathway are formed between the static portion and the dynamic portion.

18 Claims, 6 Drawing Sheets

(56) References Cited

U.S. PATENT DOCUMENTS

| | | | |
|---|---|---|---|
| 6,041,805 A * | 3/2000 | Gydesen | F16L 37/35 |
| | | | 137/614.04 |
| 6,360,795 B1 | 3/2002 | Bothe et al. | |
| 7,540,597 B2 | 6/2009 | Guhse et al. | |
| 7,543,923 B2 | 6/2009 | McNestry | |
| 9,487,012 B2 | 11/2016 | Suzuki et al. | |
| 9,527,295 B1 | 12/2016 | Gomez et al. | |
| 2003/0142176 A1 * | 7/2003 | Wu | B41J 2/17536 |
| | | | 347/85 |
| 2005/0088497 A1 * | 4/2005 | Katayama | B41J 2/17523 |
| | | | 347/86 |
| 2005/0104942 A1 * | 5/2005 | Katayama | B41J 2/17523 |
| | | | 347/86 |
| 2007/0035596 A1 | 2/2007 | Gray et al. | |
| 2010/0103232 A1 | 4/2010 | Fukushima | |
| 2011/0254905 A1 * | 10/2011 | Hayashi | B41J 2/17536 |
| | | | 347/86 |
| 2017/0368834 A1 | 12/2017 | Cameno Salinas et al. | |
| 2018/0250944 A1 | 9/2018 | Ishizawa et al. | |
| 2020/0070497 A1 * | 3/2020 | Lin | B41J 2/17553 |
| 2020/0198355 A1 * | 6/2020 | Tsuji | B41J 2/17513 |
| 2022/0402274 A1 * | 12/2022 | Hayashi | B41J 2/17513 |
| 2023/0088212 A1 * | 3/2023 | Mizutani | B41J 2/17523 |
| | | | 347/85 |

FOREIGN PATENT DOCUMENTS

| | | |
|---|---|---|
| JP | 2015024852 A | 2/2015 |
| WO | WO-0001976 W | 1/2000 |
| WO | WO-2005070680 A1 | 8/2005 |
| WO | 2009/017676 A1 | 2/2009 |

* cited by examiner

FLUID SUPPLY VALVE

BACKGROUND

Print systems, such as printers, copiers, etc., may be used to form markings on a physical medium, such as text, images, etc. A print system can perform two-dimensional (2D) or three-dimensional (3D) printing operations. In some examples, print systems may form markings on the physical medium by dispensing a liquid print substance onto a substrate surface. For example, a 2D printer may operate to dispense fluid, such as ink, onto a surface, such as paper, in a predetermined pattern. In another example, an additive manufacturing liquid is dispensed as part of a 3D additive manufacturing operation. Imaging systems can include a reservoir housed within a printing device to contain and store a supply of a print substance until it is used to form markings on the medium. A print supply container can be removably coupled to the reservoir to fill or refill the reservoir.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In general, print systems can create physical representations, patterns, or images by depositing a print substance on a print medium in a desired pattern. Printing devices can deposit print substance onto the physical medium during an imaging or printing process. In some examples, imaging devices deposit quantities of print substance onto the printable medium based on job attributes, or print parameter, of a print job. A print parameter represents a characteristic of a print job.

The printing device can include any hardware device with functionalities to physically produce representation(s) (e.g., text, images, models, etc.) on media. The media can include various types of print media, such as paper, photopolymers, plastics, composite, and can include any suitable object or materials to which a print substance from a printing device can be applied including materials such as powdered build materials for forming three-dimensional articles. Print substances such as printing agents, marking agents, and colorants, can include toner, liquid inks, or other suitable marking materials that may or may not be mixed with fusing agents, detailing agents, or other materials and can be applied to the medium. Print substance, such as liquid ink in a 2D printer or an additive manufacturing liquid in a 3D printer, is deposited on a surface from a printing device. In some examples, the printing device, such as an inkjet printer, deposits a liquid print substance that is ejectable from a printhead, such as ink, toner, binding agent, or the like.

The printing systems can be provided as a continuous source of a print substance for printing operations. Print substance is supplied from a reservoir that holds a volume of print substance prior to being ejected during printing operations. The reservoir holds a volume of print substance that is passed to the printing device and ultimately deposited on a surface. In some examples, such as a continuous print substance system, the reservoir is internal to the printing device. In some examples, more than one reservoir is arranged within the printing device. For example, each of a quantity of reservoirs arranged in the printing device can contain a different type or color of ink useful during the printing process (e.g., red, green, blue, black). Large two-dimensional (2D) and three-dimensional (3D) printers can use significant amounts of print substance when performing print jobs. Including large reservoir(s) to maintain large volume(s) of print substance within the reservoir(s) of the printing device can be useful to minimizing the filling operations. Stored volumes of print substance can be depleted from the reservoir through use during the print process. Refilling or topping off the volume of the depleted print substance volume in the reservoir can be useful.

A print substance can be supplied to the reservoir by a supply source such as a print fluid supply container. The reservoir(s) can be filled and refilled with print substance from replaceable supply sources (e.g., containers) that can be fluidly coupled to the desired reservoir during a filling operation and removed, or uncoupled, from the reservoir subsequent to the filling operation. The supply source can be removably connected to the reservoir through a connection port or inlet. The fluid connection of a fluid supply source container and the reservoir is often complex and includes many parts to create a reliable seal. A less complex reliable connection and seal is desirable. Additionally, an inability to provide an efficient exchange of air and fluid during a filling operation can inhibit the flow of print fluid into the reservoir and lead to inefficient filling operations. For example, blockage or impedance of air exiting the reservoir and entering into the print fluid supply container as print fluid exits the print fluid supply container can inhibit or prevent the flow of print fluid from the print fluid supply container. An uninhibited exchange of fluids between the print fluid supply container and the reservoir is desirable.

Figure 1:
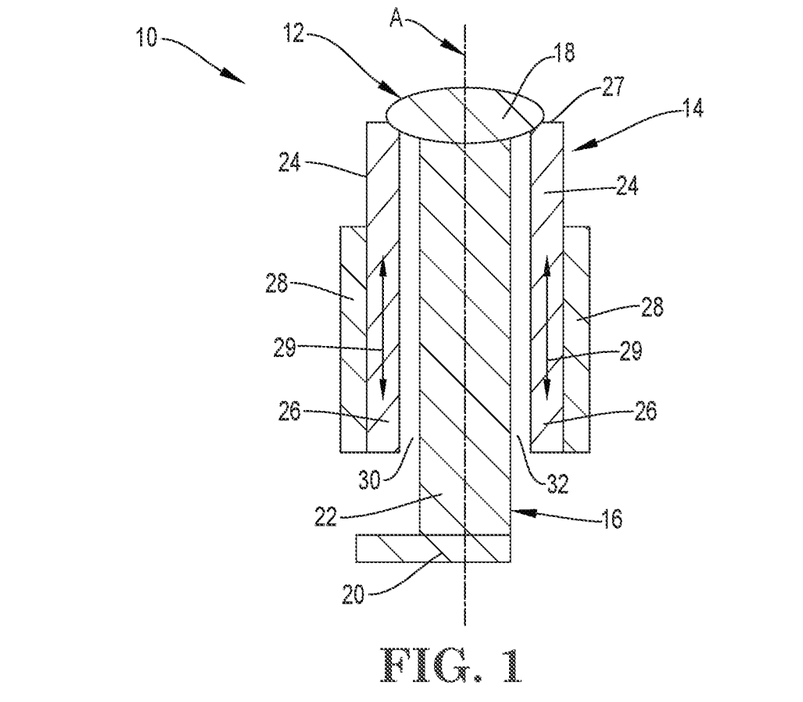
FIG. 1 is a schematic diagram of a print fluid supply valve in accordance with aspects of the present disclosure.

FIG. 1 is a schematic cross-sectional view of an example print fluid supply valve 10 useful in a printing fluid supply system in accordance with aspects of the present disclosure. The valve 10 includes a static portion 12 and a dynamic portion 14. In general terms, the dynamic portion 14 is movable relative to the static portion 12 to fluidly open and close the valve 10. The static portion 12 includes a stem 16. The stem 16 includes a head 18, a tail 20, and a shaft 22 extending between the head 18 and the tail 20. The dynamic portion 14 is disposed around the stem 16. In some examples, the dynamic portion 14 is tubular and is co-axially disposed around the static portion. The dynamic portion 14 includes a neck 24 and a body 26 extending from the neck 24. The neck 24 terminates at an open end 27. The open end 27 of the neck 24 can fluidly seal against the head 18 in the closed position of the valve 10. The body 26 can slidably and fluidly seal against a housing 28 in opened and closed positions as well as when transitioning between opened and closed positions, or states. As described in greater detail below, the dynamic portion 14 is longitudinally movable along a central axis "A" of the stem 16 between a closed position and an opened position of the valve 10, as indicated by arrows 29.

A liquid ink pathway 30 and an air pathway 32 can be defined between the static portion 12 and the dynamic portion 14. The valve 10 can be configured as a two-way valve, providing for an exchange of fluids (e.g., air and liquid ink) in two (e.g., opposing) flow directions. For example, air can exit the reservoir through the air pathway and liquid ink can enter the reservoir through the liquid ink pathway of the valve during a filling operation. The valve 10 can provide an efficient exchange of print substance and gas (e.g., air) to be made between a reservoir and a print fluid supply container when suitably coupled (not shown), as further described below.

Figure 2A:
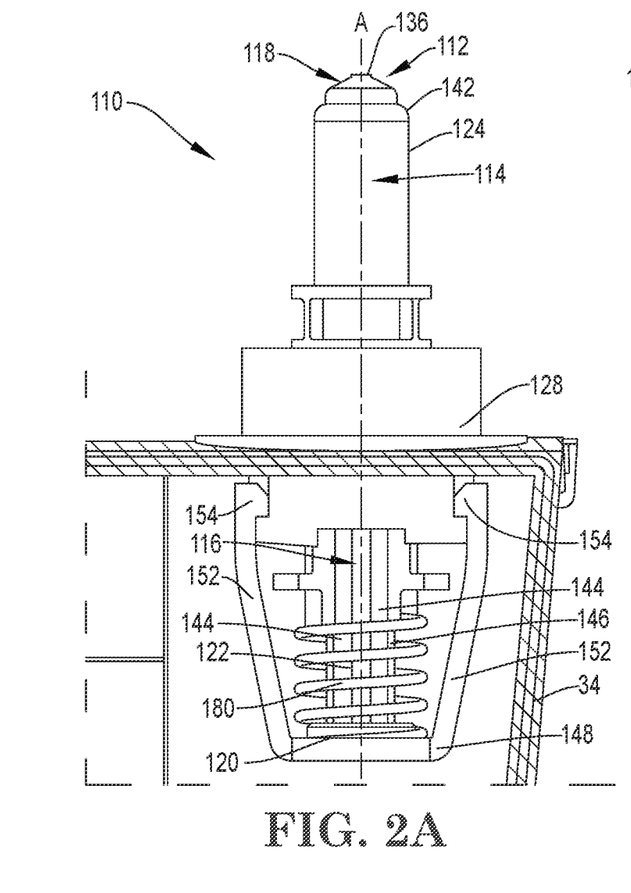
FIG. 2A is a partial cross-section of a print reservoir including a side view of an example print fluid supply valve in a closed state in accordance with aspects of the present disclosure.
Figure 2B:
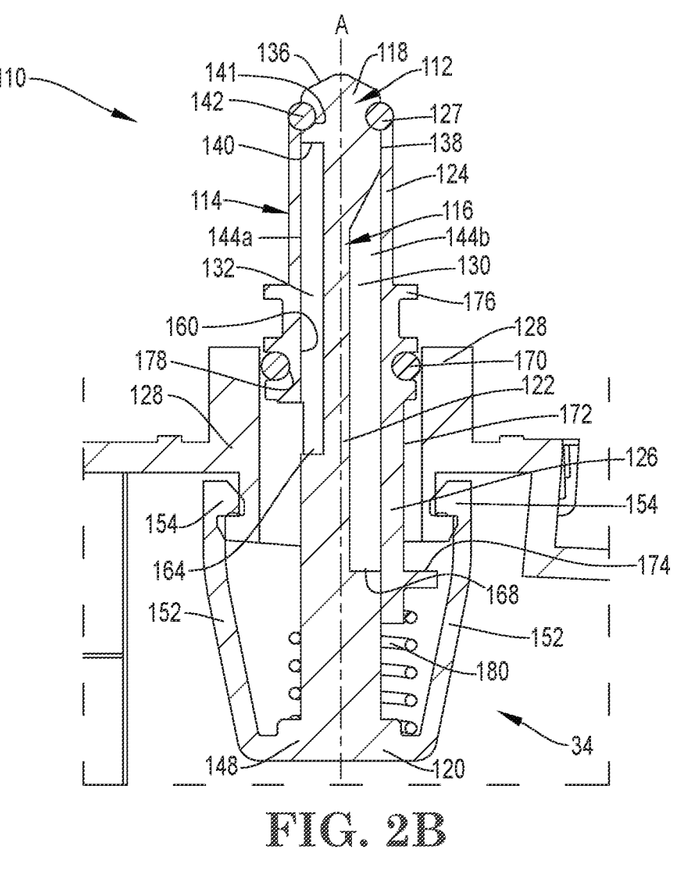
FIG. 2B is a cross-sectional view of the example print fluid supply valve in the closed state of FIG. 2A in accordance with aspects of the present disclosure.
Figure 2C:
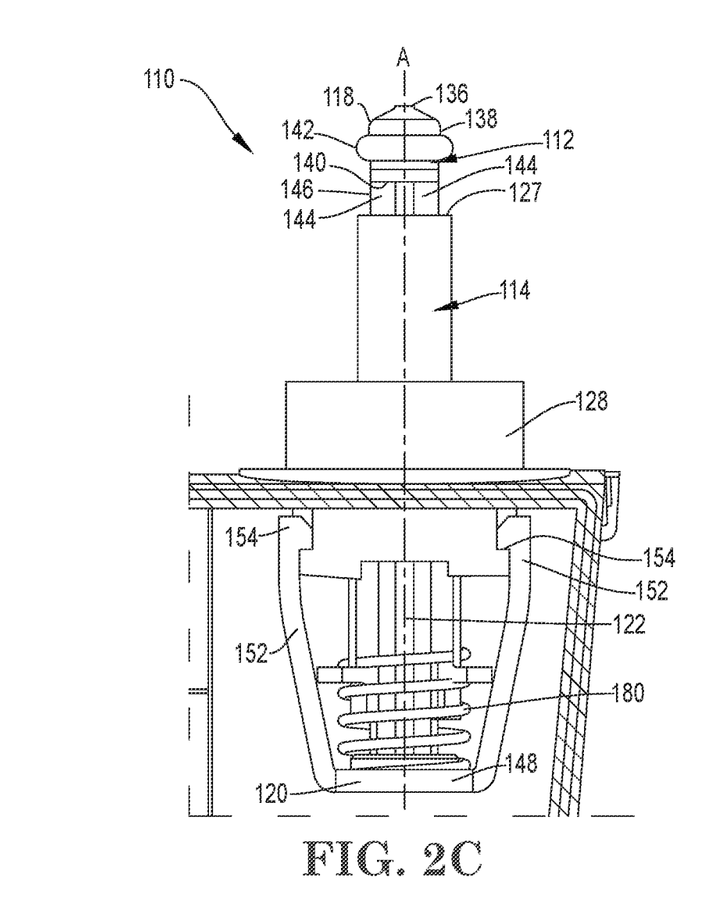
FIG. 2C is a is a partial cross-section of a print reservoir including a side view of an example print fluid supply valve of FIGS. 2A-2B in an opened state in accordance with aspects of the present disclosure.
Figure 2D:
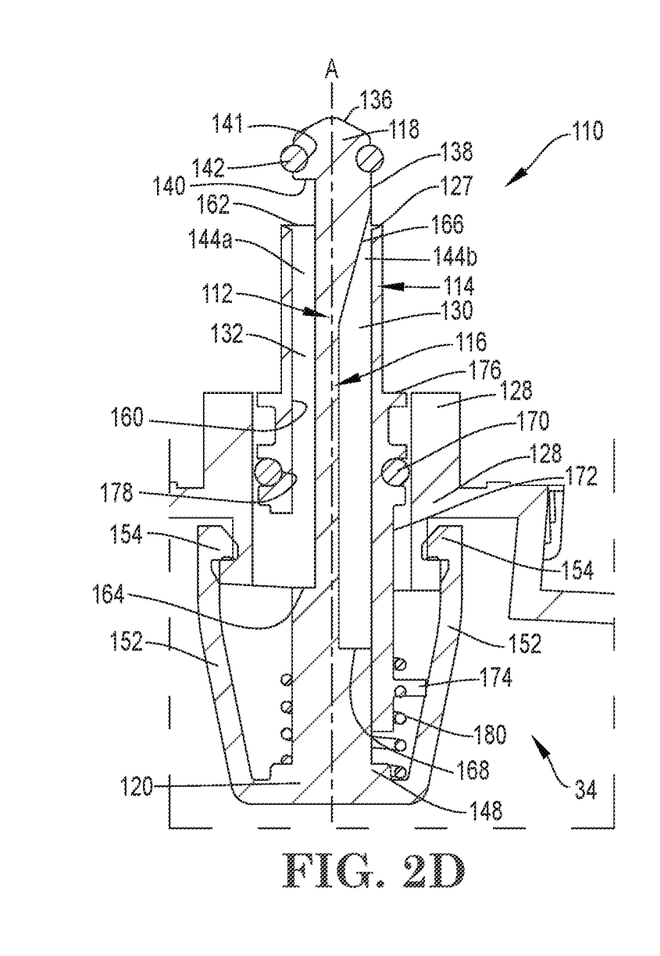
FIG. 2D is a cross-sectional view of the example print fluid supply valve in the opened state of FIG. 2C in accordance with aspects of the present disclosure.

FIGS. 2A-2D are side and cross-sectional views of an example print fluid supply valve 110 disposed in a reservoir 34 of a print system in accordance with aspects of the present disclosure. FIGS. 2A-2B illustrate the print fluid supply valve 110 in a closed state and FIGS. 2C-2D illustrate the print fluid supply valve 110 in an opened state. With reference to FIGS. 2C-2D, the valve 110 can be selectively fluidly opened when coupled to a print fluid supply container (not shown).

The valve 110 includes features similar to valve 10. The valve 110 includes a static portion 112 and a dynamic portion 114. The static portion 112 includes a stem 116 extending along a central axis "A" of the valve 110. The stem 116 of the static portion 112 can include a head 118, a tail 120, and a shaft 122 extending between the head 118 and the tail 120. The dynamic portion 114 is movably disposed around the stem 116 of the static portion 112. The dynamic portion 114 is longitudinally movable along the stem 116 between the opened position (see, e.g., FIGS. 2C-2D) and the closed position (see, e.g., FIGS. 2A-2B). The dynamic portion 114 can be coaxially disposed around the static portion 112. The dynamic portion 114 can include a neck 124 and a body 126 extending from the neck 124. The neck can terminate at an open end 127. As illustrated in FIGS. 2A and 2B, the open end 127 of the neck 124 can seal around and against the head 118 in the closed position, or closed state, of the valve 110.

Figure 3A:
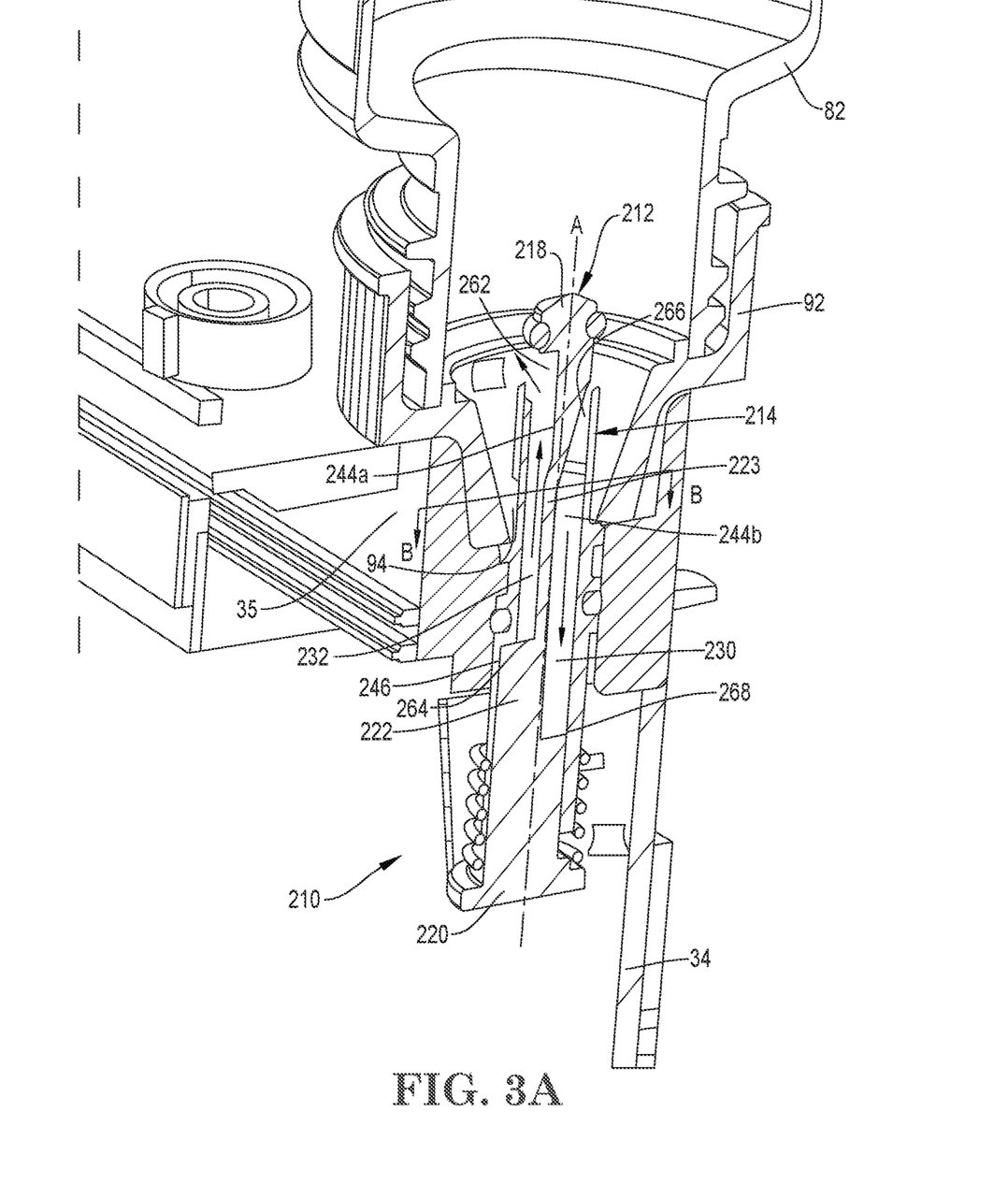
FIG. 3A is a perspective cross-sectional view of another example print fluid supply valve coupled to a print fluid supply container in accordance with aspects of the present disclosure.

When assembled to the reservoir 34, the head 118 of the stem 116 fixedly extends outside, or exterior to, the reservoir 34 and is configured to selectively extend within, or projected into, the print fluid supply container (see, e.g., FIG. 3A). The head 118 is sized and shaped to facilitate insertion into a fluid opening of a print fluid supply container (not shown). The head 118 can have a rounded or tapered top surface 136. The head 118 can include sides 138 extending from the top surface 136 and a bottom surface 140 opposite the top surface 136. The sides 138 can include a recess 141 suitable to accommodate a sealing member 142, such as an o-ring. The side and bottom surfaces 138, 140 can be suitable accommodate the neck 124 of the dynamic portion 114 slidably extending over. The sealing member 142 is disposed around the head 118 and sized to form a fluid seal with the dynamic portion 114 when the valve 110 is in a closed position. In one example, the sides 138 are generally cylindrical and generally extend parallel to the central axis "A". In one example, the bottom surface 140 is generally planar and extends generally perpendicular to the longitudinal axis and the sides 138. The head 118 can be solidly formed and without any openings or lumens suitable for fluid flow. The head 118 can be configured to fluidly seal against an inside or open end 127 of the neck 124 of the dynamic portion 114. In one example, the head 118 is partially extendable within the neck 124, such as in a closed state.

In one example, the tail 120 of the static portion 112 can include a stopper 148. The stopper 148 can be formed as plate disposed perpendicularly to the longitudinal axis. The stopper 148 can extend in a single direction or multiple directions from the shaft 122. In some examples, the stopper 148 can be circular or other appropriate shape and/or can include steps or recesses. Legs 152 can extend from the tail 120 to facilitate removably coupling the valve 110 (static portion 112) to a valve casing or valve housing 128. In one example, the legs 152 extend from the tail 120, or stopper 148 of the tail 120, radially spaced from the stem 116 and generally longitudinally along a length of the stem 116. The legs 152 can terminate at feet 154 projecting at an angle from the legs 152 to contact the housing or casing 128, as appropriate. The legs 152 can be biased outwardly away from the stem 116.

The shaft 122 can be formed as an elongated shaft extending generally linearly along the central axis "A" between the head 118 and the tail 120. The shaft 122, the head 118, and the tail 120 can be formed monolithically, as a single unit, or formed independently and assembled together. The shaft 122 can have a circular, square, or other suitable shape perpendicular to the central axis "A". The shaft 122 can have a smaller cross-sectional size than the head 118 or the tail 120. In some examples, the shaft 122 can include recessed channels 144 along the shaft 122, extending from between the bottom surface 140 of the head 118 toward the tail 120, for example. The recessed channels 144 can be partially or fully fluidly open along an exterior surface 146 of the shaft 122.

As best seen in the cross-sectional views of FIGS. 2B and 2D, a liquid ink, or print fluid, pathway 130 and an air pathway 132 are defined between the static portion 112 and the dynamic portion 114. In some examples, the liquid ink pathway 130 and the air pathway 132 are partially defined by the recessed channels 144. The air pathway 132 is defined along the channel 144a formed in the stem 116 and along the inside surface 160 of the dynamic portion 114. Below the head 118 is an air egress opening 162 of the air pathway 132 that exhausts air in to the connected supply container from within the reservoir 34. Air can enter the air pathway 132 through an air access opening 164 of the air pathway 132, with the air pathway 132 extending between the air egress opening 162 and the air access opening 164. The print fluid pathway 130 is defined along the channel 144b formed in the stem 116 and along the inside surface 160 of the dynamic portion 114. Below the head 118 is a print fluid access opening 166. The print fluid access opening 166 is fluidly connected to a print fluid egress opening 168 through the print fluid pathway 130. The channel 144a is formed radially separated from the channel 144b along the stem 116 to form the print fluid pathway 130 independent, separate and distinct from the air pathway 132. In some examples, and as further described with respect to FIGS. 3A and 3B, the pathways 130, 132 can have differing lengths and can begin and end at different positions along the length of the shaft 122. In some examples, fluids (e.g., ink and air) can be transferred through independent pathways 130, 132, respectively, to provide for unhindered and free capillary flow between the reservoir 34 and the print fluid supply container when fluidly coupled.

The dynamic portion 114 can be slidably disposed around the stem 116. In one example, the neck 124 and body 126 of the dynamic portion 114 can be generally tubular in shape, although other shapes can also be suitable. The neck 124 extends from the body 126 with the body 126 oriented toward the tail 120 and the neck 124 oriented toward the head 118 when assembled with the static portion 112. In one example, an o-ring or other suitable sealing member 170 is disposed around an exterior surface 172 of the dynamic portion 114 to form a fluid seal between the dynamic portion 114 and the housing 128. In one example, the sealing member 170 is longitudinally disposed between the neck 124 and the body 126. The body 126 can include a seal channel 178 to accommodate the sealing member 170. The sealing member 170 can facilitate a fluid seal between the dynamic portion 114 and the casing body of the port. The sealing member 170 facilitates a fluid seal between the dynamic portion 114 of the valve 110 and the reservoir 34 throughout operation of the valve 110, for example, during transition of the dynamic portion 114 between opened and closed states and in both opened and closed states of the valve 110. The sealing member 170 can form a fluid tight seal against the valve casing 128 or reservoir 34 as the dynamic portion 114 transitions between, or is in, the closed and opened positions.

In one example, the neck 124 and body 126 of the dynamic portion 114 have an equivalent inner diameters. In one example, an outer diameter of the neck 124 can be smaller or less than an outer diameter of the body 126. The outer diameters of the neck 124 and the body 126 are less than the inner diameter of the valve casing 128 at the reservoir 34. The neck 124 is sized and shaped suitably to extend within the fluid opening of the print fluid supply container. The neck 124 of the dynamic portion 114 can have an outer diameter that is sized appropriately to sealably mate within a port of the supply container (not shown). A shoulder 176 of the dynamic portion 114 can be formed between the neck 124 and the body 126. In one example, the shoulder 176 can be formed as radial extension between the neck 124 and body 126. In one example, the shoulder 176 is a generally planar disk shape, although other shapes suitable to facilitate connection between the supply container and the valve 110 are also acceptable. In one example, a biasing stop 174 is disposed along a terminal end portion of the body.

A biasing mechanism 180, such as a spring, can be disposed around the elongated shaft 122 of the static portion 112 and connected to the body 126 of the dynamic portion 114. The biasing mechanism 180 can be disposed between, and coupled to, the tail 120 of the static portion 112 and the biasing stop 174 of the dynamic portion 114. In one example, one end of the biasing mechanism 180 can be attached to the stopper 148. The biasing mechanism 180 biases the valve 110 toward the closed state with the neck 124 of the dynamic portion 114 sealed against the head 118 of the static portion 112.

In one example, the static and dynamic portions 112, 114 are each formed of polyethylene, polypropylene, or other suitable material. Glass fiber or glass bead fill, for example, can be included in the suitable material to add structural strength if desired. The biasing mechanism 180 can be formed of metal, such as stainless steel, or other appropriate material.

The valve 110 is illustrated coupled to the valve casing or housing 128 of the reservoir 34. The body 126 includes an exterior surface 172 that can slidably and fluidly seal against and within the casing 128. The housing 128 can be formed as part of the reservoir 34 or as part of the valve 110. In some examples, the casing 128 can be separately assembled to the reservoir 34 and/or to the valve 110. In one example, the casing 128 can be formed integrally with the reservoir 34. Regardless, the valve casing 128 forms a fluid-tight seal with the reservoir 34.

Figure 3B:
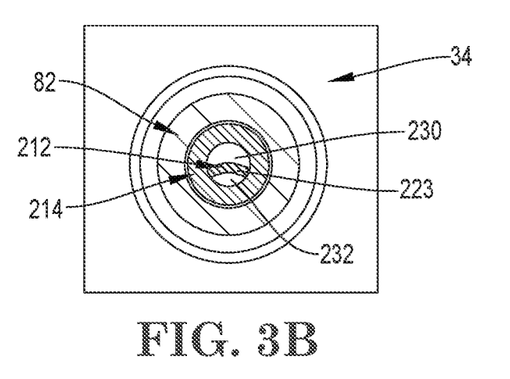
FIG. 3B is a perpendicular cross-sectional view of the example print fluid supply valve of FIG. 3A in accordance with aspects of the present disclosure.

FIG. 3A is a perspective cross-sectional view of another example valve 210 in accordance with aspects of the present disclosure. FIG. 3B illustrates a cross-sectional view of the valve 210 along line B-B of FIG. 3A. FIG. 3A illustrates the valve 210 in an open state, fluidly coupled with an example print fluid supply container 82. The valve 210 is similar to the valve 110 described above and can incorporate any of the features of valve 110 described above and are similarly numbered without being further described in this example. A liquid ink pathway 230 and an air pathway 232 are formed between a static portion 212 and a dynamic portion 214 of the valve 210.

A stem (see, e.g., 116 of FIG. 2B) of the static portion 212 can include a head 218, a tail 220, and a shaft 222 extending between the head 218 and the tail 220. Channels 244a, 244b can be recessed into the shaft 222 and fluidly open along an exterior surface 246. A divider section 223 can be formed along the shaft 222 between the channels 244a, 244b to define the channels 244a, 244b as extending separately and distinctly along circumferential sides of the shaft 222. The shaft 222 of the static portion 212 extends within the dynamic portion 214 to fluidly separate, or generally fluidly separate, an airflow pathway 232 from a print fluid pathway 230. The print fluid pathway 230 can be defined along the channel 244b formed in the shaft 222 and the inside surface of the static portion 214. The channel 244b is formed separated from the channel 244a along the shaft 222 to form the print fluid pathway 230 independent, separate and distinct from the air pathway 232.

The divider section 223 is structurally sufficient to maintain the rigidity and form of the shaft 222. The divider section 223 can be chevron or curvilinear shaped in cross-section, for example, as illustrated in FIG. 3B. Other shapes such as linear, etc. can also be acceptable. In some examples, as illustrated in FIG. 3B, the divider section 223 defines a larger first cross-sectional area of the liquid ink pathway 230 than a second cross-sectional area of the air pathway 232. The difference in cross-sectional size of the smaller air pathway 232 and the larger liquid ink pathway 230 can facilitate equivalent flow rates for the air and ink due to the much lower viscosity of air than the print fluid.

The air pathway 232 extends from an air egress opening 262, disposed below the head 218, and extending along the divider section 223 of the shaft 222 to an air access opening 264. The air pathway 232 exhausts gas (e.g., air) to a print supply container 82 from the reservoir 34 during a filling/refilling operation. Below the head 218, and also, in some examples, below the air egress opening 264, is a print fluid access opening 266. The print fluid pathway 230 extends along the divider section 223 of the shaft 222 between the print fluid access opening 266 and a print fluid egress opening 268. The print fluid egress opening 268 can be disposed below the air access opening 264 on the shaft 222. In some examples, the air access opening 264 is disposed along the shaft 222 above, or closer to the head 218, than the print fluid egress opening 268. In one example, a length of the air pathway 232 is shorter than a length of the liquid ink pathway 230. The shorter air pathway 232 enables the air to move upward from the reservoir 34 into the print fluid supply container 82 and the longer ink pathway 230 allows for the ink to flow downward into the reservoir 34 and establishes a pressure head to assist with the air and ink exchange. This can provide for egress of the air from the reservoir 34 into the print fluid supply container 82 to begin the capillary flow of print fluid into the reservoir 34 from the print fluid supply container 82.

Figure 4A:
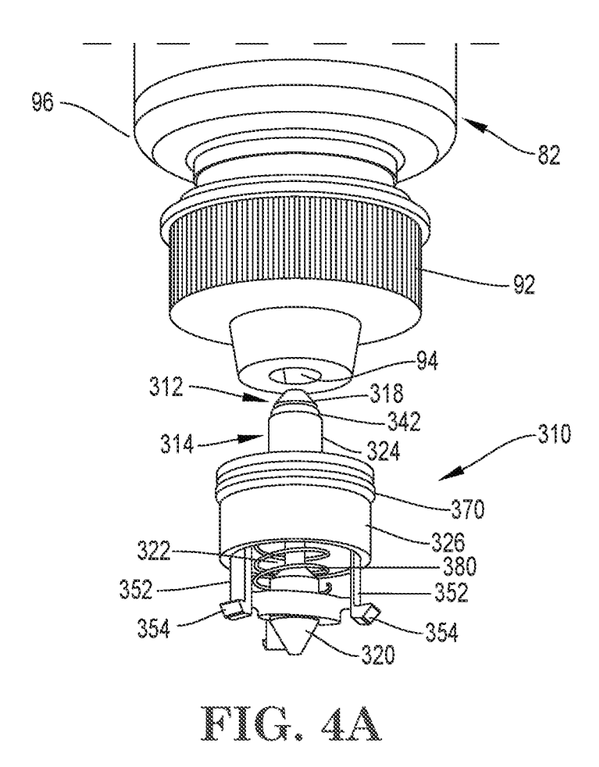
FIG. 4A is a perspective view of another example print fluid supply valve and print fluid supply container in accordance with aspects of the present disclosure.
Figure 4B:
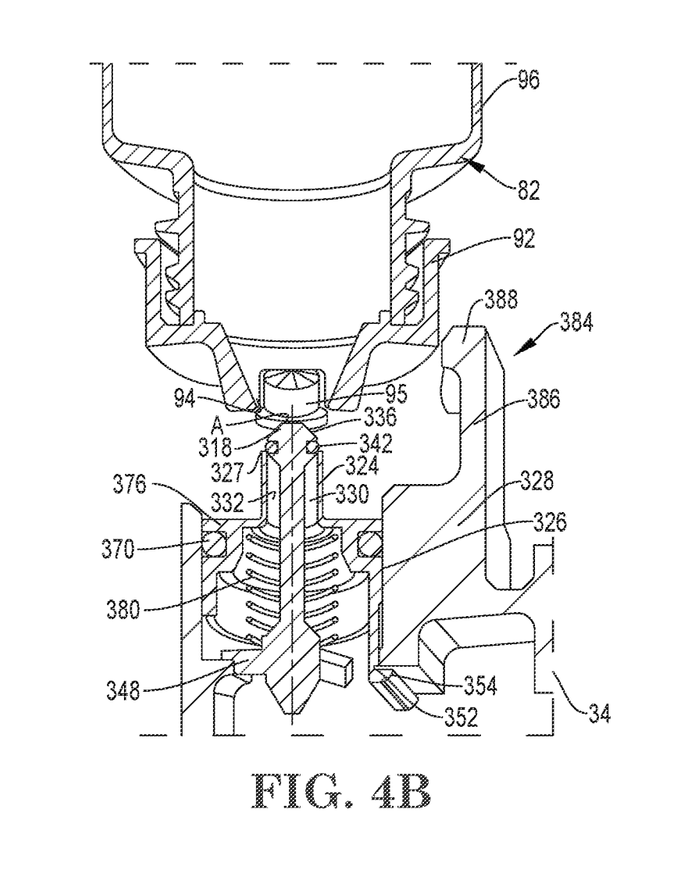
FIG. 4B is a partial cross-sectional view of a print reservoir including the example print fluid supply valve in a closed state and the print fluid supply container of FIG. 4A prior to matingly coupling in accordance with aspects of the present disclosure.
Figure 4C:
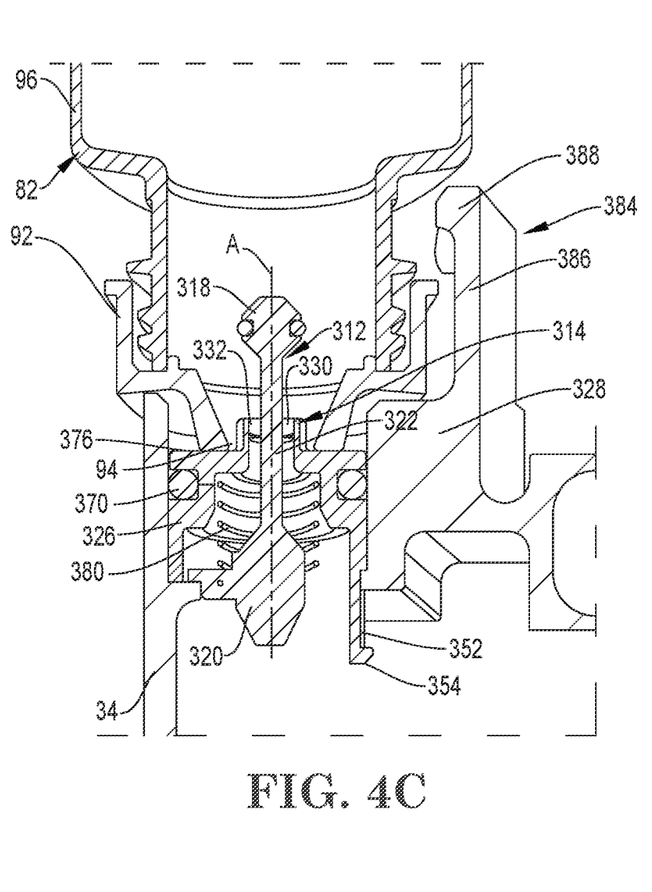
FIG. 4C is a cross-sectional view of the example print fluid supply valve in an opened state, coupled to the print fluid supply container of FIGS. 4A-4B in accordance with aspects of the present disclosure.

FIGS. 4A-4C illustrates another example of a print fluid supply valve 310 useful in a reservoir 34 of a print system. FIG. 4A is a perspective view of the valve 310 and an example print fluid supply container 82. FIG. 4B is a cross-sectional view of the valve 310 in a closed state. FIG. 4C is a cross-sectional view of the valve 310 in an opened state, fluidly connected to the print fluid supply container 82.

The valve 310 includes a static portion 312 and a dynamic portion 314, similar to the valves 10, 110, 210 described above. In one example, the valve 310 can include, or be assembled to, a valve casing 328 to house the valve 310 and attach the valve 310 to the reservoir 34. The valve 310 can be disposed within or at an inlet port of the reservoir 34. The valve casing 328 can be coupled to or formed integrally with the housing of the reservoir 34. In one example, the valve casing 328 can be formed to encircle and secure the static and dynamic portions 312, 314 of the valve to the reservoir 34. In one example, the valve casing 328 can include a bottle retention hook 384 that can releasably couple with the print supply fluid container 82 to secure the print supply fluid container 82 in the desired position relative to the valve 310 and the reservoir 34 while transferring fluids between the print supply fluid container 82 and the reservoir 34. In one example, the bottle retention hook 384 can include arm 386 with a hooked end 388 that snap flexes towards and away from the print supply fluid container 82 to secure and unsecure the print supply fluid container 82 from the reservoir 34.

The dynamic portion 314 can be slidably disposed around the static portion 312 and within the valve casing 328. The body 326 can include a leg, or legs, 352 to slidably couple with the valve casing 328 or the reservoir 34 and limit longitudinal movement of the dynamic portion 314 in an upward, unbiased direction. In one example, the leg 352 includes a foot 354 that extends radially outward to interact with the reservoir 34 or valve casing 328. The static portion 312 can be fixedly coupled to the valve casing 328 of the print reservoir 34. In one example, the tail 320 is fixedly coupled to the valve casing 328. The valve casing 328 is fluidly sealed to the reservoir 34. In one example, the tail 320 of the static portion 312 includes a stopper 348. The stopper 348 can be formed as extending radially outward from the central longitudinal axis "A" to engage with the valve casing 328 or the housing of the reservoir 34 and maintain the static portion 312 in a fixed spatial relationship with the reservoir 34.

The head 318 of the static portion 312 can include a rounded or tapered top surface 336. The head 318 can include a side surface (see, e.g., 138 of FIG. 2B) extending from the top surface 336 and a bottom surface (see, e.g., 140 of FIG. 2B) opposite the top surface 336. Alternatively, the head 318 can be generally rounded including the top, side, and bottom surfaces (see, e.g., 336 of FIG. 4B and 138, 140 of FIG. 2B). The side surface can include a recess (see, e.g., 141 of FIG. 2B) suitable to accommodate a sealing member 342, such as an o-ring. The side and bottom surfaces can be shaped and sized to suitably to extend within the fluid opening 94 of the container 82 and also to accommodate the neck 324 of the dynamic portion 314 slidably extending over. The sealing member 342 can be disposed around the head 318 and sized to form a fluid seal with the dynamic portion 314 when the valve 310 is in a closed state. In one example, the head 318 can be solid bodied and without any openings or lumens suitable for fluid flow. An outside diameter of the head 318 can be slightly less than an inside diameter of the neck 324 and the body 326 of the dynamic portion 314. A shaft 322 of the stem (see, e.g., 116 of FIG. 2B) extends longitudinally between the head 318 and the tail 320. The shaft 322 can be formed as a solid bodied shaft extending linearly along the central longitudinal axis "A". The shaft 322 can have a circular, square, or other suitable shape in cross-section to the axis "A".

The neck 324 and the body 326 of the dynamic portion 314 can be generally tubular in shape, for example, although other shapes can also be suitable. The outer diameters of the neck 324 and the body 326 are less than the inner diameter of the valve casing 328. The neck 324 extends from the body 326 with the body 326 oriented toward the tail 320 and the neck 324 oriented toward the head 318. In one example, the neck 324 has an inner diameter greater than an outer diameter of the shaft 22. The neck 324 can have an outer diameter suitable to extend within the fluid opening 94 and to sealably mate with the supply container 82. A length of the neck 324 is suitable to extend within the supply container 82 through the sealing fluid opening 94. The neck 324 is suitable to accommodate a flow of fluids between the print fluid supply container 82 and the reservoir 34 in an open state (see, e.g., FIG. 4C) of the valve 310 and is suitable to seal against the sealing member 342 at the head 318 when in a closed state (see, e.g., FIG. 4B).

The body 326 has an inner diameter sized to accommodate a biasing mechanism 380 and flow of fluids and an outer diameter suitable to slidably move within the valve casing 328. In one example, an outer diameter of the neck 324 can be smaller, or less than, the outer diameter of the body 326. A shoulder 376 of the dynamic portion 314 can be formed between the neck 324 and the body 326. In one example, the shoulder 376 can be formed as radial extension between the neck 324 and the body 326. In one example, the shoulder 376 is planar although other shapes suitable to facilitate connection between the supply container 82 and the valve 310 are also acceptable. In one example, a sealing member 370, such as an o-ring or other suitable seal, is disposed along an exterior surface (see, e.g., 172 of FIG. 2B) of the body 326. In one example, the sealing member 370 is disposed within a seal channel (see, e.g., 178 of FIG. 2B) of the body 326. In one example, the sealing member 370 can facilitate and maintain the body 326 of the dynamic portion 314 slidably sealing against the interior surface of the valve casing 328. The sealing member 370 can form a fluid tight seal against the valve casing 328 as the dynamic portion 314 transitions between, or is in, the closed and opened states.

The biasing mechanism 380 can be disposed around the shaft 322 and positioned adjacent to the tail 320. In one example, the biasing mechanism 380 can be maintained along the shaft 322 by connection at the tail 320. The biasing mechanism 380 can be disposed within the body 326 of the dynamic portion 314, biased and extending between the shoulder 376 and the tail 320. In one example, the biasing mechanism 380 is in an unbiased position when the valve 310 is in a closed state and in a biased position when the valve 310 is in an opened state. In one example, the biasing mechanism 380 can be a spring. Other forms and types of biasing are also acceptable.

A liquid ink pathway 330 and an air pathway 332 can be formed to extend between the static portion 312 and the dynamic portion 314. In some examples, the liquid ink pathway 330 and the air pathway 332 are fluidly connected. Air and ink can be fluidly exchanged through the valve 310 via capillary action between the print fluid supply container 82 and the reservoir 34 via the liquid ink and air pathways 330, 332.

It is understood that the print fluid supply containers 82 described in the present disclosure are merely examples, and other suitable containers can be employed in accordance with principles of this disclosure. The print fluid supply containers 82 useful in connection with the valves of the pending application are rigid or semi-rigid and can maintain a manufactured shape through the filling process of the reservoir 34. In some examples, the print fluid supply container 82 includes the cap 92 removably coupled to the container body 96, such as via a mateable threaded connection. The cap 92 can include a membrane 95 disposed across the fluid opening 94 that fluidly seals the fluid opening 94 when not penetrated. The membrane 95 can be selectively opened (e.g., broken) to allow fluid to enter and/or exit the supply container 82, such as during a filling operation of the reservoir 34.

In use, the valve 310 (and similarly valves 10, 110, 210) of the present disclosure is normally biased to be in a closed state and provides a fluidly sealed opening at the inlet, or fill port, of the reservoir 34 (see, e.g., FIGS. 2A-2B and 4B). In the closed state, the seal member 342 at the head 318 interfaces with the open end 327 of the neck 324 to provide a fluid seal between the static and dynamic portions 312, 314. The dynamic portion 314 is fully extended upward against the seal member 342 at the head 318 and, in some examples, the feet 354 are positioned against an interior surface of the reservoir 34 housing or the valve casing 328. To implement a filling operation, the supply container 82 is brought into position by aligning the fluid opening 94 of the supply container 82 with the head 318 of the stem. The supply container 82 can be pushed downward unto the valve 310 at an inlet port (see, e.g., 335 of FIG. 5) to extend the head 318 and the neck 324 through the fluid opening 94 and penetrate the membrane 95. In one example, the membrane 95 flexibly opens in response to pressure from the head 318. The continued downward motion of the supply container 82 brings the cap 92 into contact with the shoulder 376 of the dynamic portion 314 and slidably moves, or transitions, the dynamic portion 314 downward until the valve 310 is fluidly opened. In some examples, the supply container 82 can be removably secured to the reservoir 34 with the bottle retention hook 384, or other coupling member, that flexibly latches onto the cap 92 of the supply container 82 (see, e.g., FIGS. 4C). Other mechanisms to releasably secure the supply container 82 to the reservoir 34 are also acceptable. The supply container 82 can be lifted upward to disengage the supply container 82 from the valve 310. The dynamic portion 314 of the valve 310 correspondingly moves upwards as the downward pressure of the supply container 82 is reversed and the biasing mechanism 380 returns the valve 310 to a closed state. The neck 324 of the dynamic portion 314 fluidly seals with at the head 318 of the static portion 312 prior to full removal and disengagement of the supply container. In this manner, a negative pressure within the reservoir 34 can be maintained.

Figure 5:
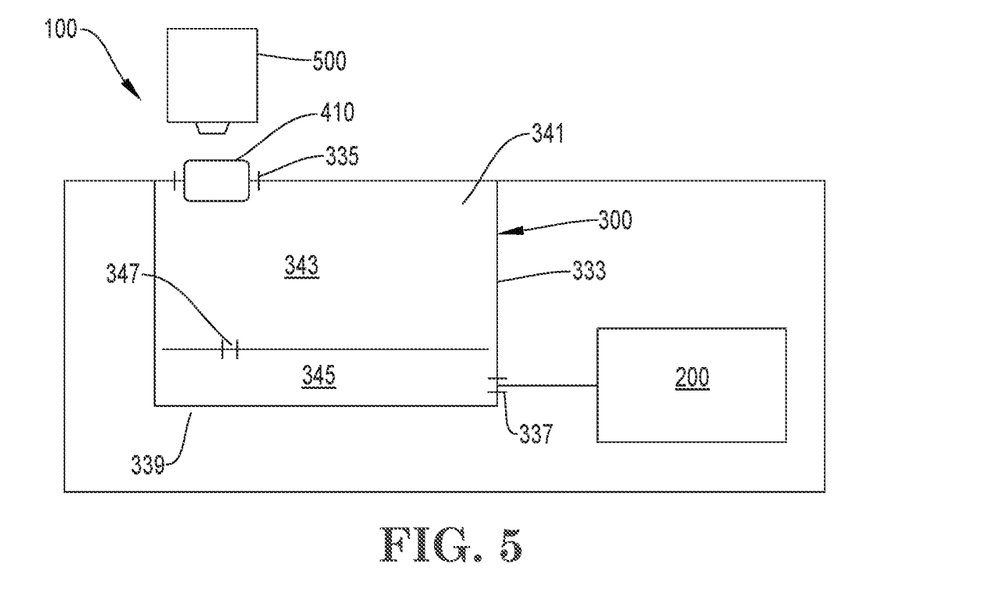
FIG. 5 is a schematic diagram of a print system including a print fluid supply valve in accordance with aspects of the present disclosure.

FIG. 5 illustrates schematic view of a print system 100 including a valve 410 (illustrated generally, akin to any of valves 10, 110, 210, 310) for a printing fluid supply system in accordance with aspects of the present disclosure. The print system 100 includes a printhead 200, a print reservoir 300, and the valve 410 to selectively couple a print fluid supply container 500 to the print reservoir 300. The reservoir 300 can be arranged within the print system 100. The print reservoir 300 is fluidly coupled to the printhead 200. The print reservoir 300 can be maintained at a negative pressure. The valve 410 can selectively sealingly seal and fluidly connect the print fluid supply container 500 to the print reservoir 300 to maintain the negative pressure within the print reservoir 300 when the print fluid supply container 500 is selectively coupled to the print reservoir 300.

The valve 410 can be coupled to a housing 333 of the reservoir 300. The housing 333 includes an inlet port 335 to receive print substance and an outlet 337 to extract a print substance in response to printing operations of the print system 100 to form markings on a medium. The inlet port 335 and the outlet 337 can be formed as openings within the housing 333 between an interior cavity 341, or interior, and an exterior 339 of the housing 333. The exterior 339 can be suitably attached within the print system 100 and is open to ambient air. The valve 410 is disposed at the inlet port 335 to provide for filling or refilling the reservoir 300 with print substance. The valve 410 can extend at or through the inlet port 335. The outlet 337 is to provide passage of the print substance out of the reservoir 300 to the printhead 200.

The size and shape of the reservoir 300 is appropriate to maintain a predetermined volume of print substance and a volume of gas (e.g., air) to be contained above the print substance. The print substance and gases within the interior cavity 341 of the reservoir 300 can be maintained at a predetermined pressure, or pressure range. In one example, the print reservoir 300 includes a main tank 343 and a feeder tank 345. The main tank 343 and feeder tank 345 can be fluidly connected. In one example, print substance can flow from the main tank 343 to the feeder tank 345 via gravity.

Although only one reservoir 300 is illustrated, in some examples, where more than one reservoir 300 is arranged within the print system 100, the reservoirs 300 can have the same or differing sizes and shapes as appropriate to fit within the printing system 100 and to each contain a predetermined volume of print substance. The volumes of print substance and gases (e.g., air) within each reservoir 300 can be correspondingly adjustable relative to each other. For example, when a print fluidly supply container 500 is coupled to the print reservoir 300, a volume of gases can be vented into the print fluid supply container 500 as an equivalent volume of print substance is transferred into the reservoir 300. The reservoir 300 and the print fluid supply container 500 can each be formed of a rigid, or semi-rigid, material suitable to maintain a manufactured shape during use within a print system 100, including pressurization.

In accordance with aspects of the present disclosure, negative pressure can be maintained within the print reservoir 300 by the valve 410 when the valve 410 is in an opened state, in a closed state, and during transitioning of the between the opened and closed states. The main tank 343 includes the inlet port 335 including the valve 410 and a tank connection port 347 between and fluidly connecting the main tank 343 and the feeder tank 345. The main tank 343 is otherwise fluidly sealed to maintain the desired pressure within the main tank 343. The feeder tank 345 includes the outlet 337 to provide print fluid flow from the feeder tank 345 to the printhead 200 and a vent to atmosphere. In some examples, the main tank 343 is maintained under the desired negative pressure with the valve 410 being selectively opened to fluidly couple with the print fluid supply container 500, essentially including the print fluid supply container 500 with the reservoir 300 under the desired negative pressure. The tank connection port 347 can be selectively opened to transfer print fluid into the feeder tank 345 in response to a print operation increasing the negative pressure in the feeder tank 345 and against the tank connection port 347.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A valve for a printing fluid supply system, the valve comprising:
   a static portion comprising a stem extending along a longitudinal axis, the stem including a head, a tail, and a shaft extending between the head and the tail; and
   a dynamic portion disposed around the stem, the dynamic portion longitudinally movable along the stem between a closed position and an opened position, the dynamic portion including:
      a neck;
      a body extending longitudinally from the neck; and
      a shoulder formed between the neck and the body,
   wherein, while in the closed position, the neck seals around the head and while in the opened position, the neck extends within an opening of a container up to the shoulder and is fluidly open, the body to slidably fluidly seal against a housing between opened and closed positions,
   wherein a liquid ink pathway and an air pathway are formed between the static portion and the dynamic portion.

2. The valve of claim 1, wherein the liquid ink pathway is separate from the air pathway.

3. The valve of claim 1, wherein the head has a rounded top surface.

4. The valve of claim 1, wherein the tail is fixedly coupled to the housing.

5. The valve of claim 1, further comprising:
   a biasing mechanism to bias the dynamic portion to the closed position.

6. The valve of claim 5, wherein the biasing mechanism is disposed around the shaft adjacent to the tail.

7. The valve of claim 1, wherein the air pathway has an air access opening above a liquid ink egress opening.

8. A print fluid supply system, comprising:
   a valve to selectively couple a print fluid supply container to a print reservoir, the valve fixedly coupled to the print reservoir, the valve comprising:
      a static portion comprising a stem extending along a longitudinal axis, the stem including a head, a tail, and a shaft extending between the head and the tail; and
      a dynamic portion disposed around the stem, the dynamic portion longitudinally movable along the stem between a closed position and an opened position, the dynamic portion including:
         a neck;
         a body extending longitudinally from the neck; and
         a shoulder formed between the neck and the body,
      wherein, while in the closed position, the neck seals around the head and while in the opened position, the neck extends within an opening of a container up to the shoulder, the body to slidably fluidly seal against a valve casing between opened and closed positions,
      wherein a liquid ink pathway and an air pathway are formed between the static portion and the dynamic portion.

9. The print fluid supply system of claim 8, wherein the shaft includes channels for each of the liquid ink pathway and the air pathway, wherein the shaft includes a divider defined between the channels.

10. The print fluid supply system of claim 9, wherein the divider fluidly separates the liquid ink pathway from the air pathway.

11. The print fluid supply system of claim 8, wherein a first cross-sectional area of the liquid ink pathway is greater than a second cross-sectional area of the air pathway.

12. A print system, comprising:
   a printhead;
   a print reservoir fluidly coupled to the printhead, the print reservoir maintained at a negative pressure;
   a valve to selectively couple a print fluid supply container to the print reservoir, the valve fixedly coupled to the print reservoir, the valve comprising:
      a static portion comprising a stem extending along a longitudinal axis, the stem including a head, a tail, and a shaft extending between the head and the tail; and
      a dynamic portion disposed around the stem, the dynamic portion longitudinally movable along the stem between a closed position and an opened position, the dynamic portion including:
         a neck;
         a body extending longitudinally from the neck; and
         a shoulder formed between the neck and the body,
      wherein, while in the closed position, the neck seals around the head and while in the opened position, the neck extends within an opening of a container up to the shoulder, the body to slidably fluidly seal against a casing between opened and closed positions,
   wherein a print fluid pathway and an air pathway are formed between the static portion and the dynamic portion, wherein the valve is to seal the print fluid supply container to the print reservoir to maintain the negative pressure when selectively coupled.

13. The print system of claim 12, wherein the valve is to maintain the negative pressure of print reservoir while transitioning between open and closed positions.

14. The print system of claim 12, wherein the print fluid pathway has a first cross-sectional area greater than a second cross-sectional area of the air pathway.

15. The print system of claim 12, wherein the shaft includes a divider defined between the print fluid pathway and the air pathway, wherein the print fluid pathway is fluidly separated from the air pathway by the divider.

16. The valve of claim 1, wherein the shoulder radially extends away from the neck and the body of the dynamic portion.

17. The valve of claim 1, further comprising a sealing member disposed around an exterior surface of the dynamic portion to form a fluid seal between the dynamic portion and the housing.

18. The valve of claim 17, wherein the shoulder is formed between the neck and the sealing member.

* * * * *